2

United States Patent Office 3,753,899
Patented Aug. 21, 1973

3,753,899
MIXED BED DEIONIZATION
Robert Kunin, Yardley, and Paul A. Kittle, Gardenville, Pa., assignors to Rhom and Haas Company, Philadelphia, Pa
No Drawing. Continuation of abandoned application Ser. No. 85,737, Oct. 30, 1970. This application Feb. 4, 1972, Ser. No. 223,794
Int. Cl. B01d 15/04
U.S. Cl. 210—33           10 Claims

ABSTRACT OF THE DISCLOSURE

An improved mixed bed deionization system comprising a mixture of cation and anion exchange resins in intimate association with one another, and more particularly, a mixed bed system comprising a mixture of strong acid cation exchange resins and weak base anion exchange resins with certain critical kinetic characteristics, is disclosed and claimed.

---

This is a continuation of application Ser. No. 85,737 filed Oct. 30, 1970, now abandoned.

This invention relates to the removal of salts and other electrolytes from solutions by means of ion exchange resins. It is particularly applicable to the removal of salts from aqueous solutions in which it is desirable (1) to remove the salts as completely as possible and (2) to regnerate the ion exchange resins as efficiently as possible and in which it is undesirable to have the pH of the solution vary appreciably from neutrality during the course of the process. The present invention is also useful in anti-pollution applications, such as, tertiary sewage treatment and waste regenerant disposal from certain deionization units.

It is known that salts may be removed from aqueous solutions by passing the solution through a bed of certain cation exchange resins in their hydrogen form and then through a bed of an anion exchange resin. It has also been found that by using certain anion exchange resins in which the polar groups are quaternary ammonium groups this order can be reversed. In either order, however, the pH of the solution leaving the first bed is substantially different from that of the original solution and in many instances this is an undesirable condition which limits the applicability of ion exchange processes of salt removal. It has also been known that salts may be removed from solutions through mixed beds of anion exchange resins in the base-regenerated form and cation exchange resins in the acid form. Although many of such mixed bed systems have been investigated, only the ones containing quaternary ammonium anion exchange resins as the anion exchange resin component have been effective and commercialized to any appreciable extent. The mixed bed system containing the strong base quaternary ammonium anion exchange resin and the strong acid sulfonic acid cation exchange resin has been widely employed since it yields the ultimate degree of salt removal and since the ion exchange resin components may be readily separated and the individual ion exchange resins may be regenerated in the usual manner in the original ion exchange resin column, for example, see U.S. Pat. 2,578,937, the disclosure of which is hereby incorporated herein by reference.

There are many situations in which it would be highly desirable to replace the strong base quaternary ammonium anion exchange resin with a weak base anion exchange resin. This situation, if possible, would result in considerable economic gains since the weak base resin can be regenerated more economically than the former. It would also permit one to desalt solutions containing substances that may react with the highly alkaline environment associated with quaternary ammonium anion exchange resins in the hydroxide form. Such systems have been considered and studied; however, their use has never materialized since extremely poor results have consistently been obtained. Since weak base anion exchange resins have been considered primarily as acid adsorbents, the poor performance of the mixed bed system consisting of a strong acid cation exchanger and a weak base anion exchange resin has been attributed to the unfavorable equilibrium associated with such mixed beds.

Surprisingly, it has now been found that it is possible to devise mixed beds of strong acid cation exchange resins and certain weak base anion exchange resins whose performances exceed, by far, the performance normally anticipated by such mixed beds. Contrary to prevailing thought the performance of such mixed beds is, unexpectedly, controlled by the kinetic performance of the weak base anion exchange resin component rather than the equilibria of the mixed bed system. It has also been found that it is possible to define the suitability of the anion exchange resin component of this mixed-bed system in terms of a kinetic half-life of the anion exchange resin.

The poor results that have heretofore been obtained with such mixed beds as compared with multiple or sequential beds of strong acid cation exchange and weak base anion exchange resins is illustrated in Example 1. (In the examples, reference to mesh is determined with U.S. Standard Screen.)

EXAMPLE 1

Fifty milliliters (16–50 mesh) of a strong sulfonic acid cation exchange resin comprising a sulfonated gel-type cross-linked polystyrene resin (available, for example, under the trademark Amberlite IR–120) and an equal volume of a weak base, gel type, polystyrene-polyamine anion exchange resin (20–50 mesh) (available, for example, under the trademark Amberlite IR–45), and prepared according to the teachings of U.S. Pat. 2,591,574, are each placed in separate 100 milliliter glass burets connected in series with plastic tubing (System B) with the buret containing the cation exchange resin being placed ahead of the buret containing the weak base anion exchange resin. The strong acid cation exchange resin is in the hydrogen form and the weak base anion exchange resin is in the free base form. Another 100 ml. glass buret is packed with 100 ml. of a mixture containing 50 ml. of each of the forementioned ion exchange resins (System A). A solution containing 500 p.p.m. NaCl is then passed through System A and System B, operated in parallel, at a contact time of approximately 2 minutes and the effluents of both System A and System B are monitored by conductance measurements. The following data are collected:

| Effluent bed volume | Effluent electrical resistance (ohm-cm.) | |
|---|---|---|
| | System A (mixed bed) | System B (series) |
| 5 | 600,000 | 1,000,000 |
| 10 | 500,000 | 1,000,000 |
| 30 | 500,000 | 1,000,000 |
| 60 | 20,000 | 1,000,000 |
| 80 | 10,000 | 800,000 |
| 100 [1] | 1,000 | 600,000 |

[1] The specific resistance in ohm-cm. of a 500 p.p.m. NaCl solution is approximately 1,000.

NOTE.—1 bed volume=combined volume of anion and cation exchange resins.

Since the electrical resistance of the effluent water varies directly with its purity, the higher the resistance the purer the water and it is, therefore, quite obvious that the performance of the conventional two-bed system (B)

is superior to that of the mixed-bed system (A), when the above ion exchange resins are used.

EXAMPLE 2

On replacing the anion exchange resin of Example 1 with a macroreticular, tertiary amine, weak base anion exchange resin (mesh size, thru 25, 95% retained on 50 mesh screen) and repeating the procedure of Example 1, the data given below are collected.

The macroreticular, weak base anion exchange resin contains tertiary amine functionality on a styrene-divinylbenzene matrix, and an extensive fixed porosity in the resin's bead structure. This weak base macroreticular resin has a density of about 40 lbs./cu. ft., about 40 percent voids, and a minimum exchange capacity of about 21 kilograins (as calcium carbonate) per cubic foot. These macroreticular resins are known materials and can be prepared by known procedures, for example by the procedures taught in British Pats. 932,125 and 932,126. [The macroreticular weak base resin used above is available, for example, under the trademark Amberlite XE-270.]

| Effluent bed volume | Effluent electrical resistance (ohm-cm.) | |
|---|---|---|
| | System A (mixed bed) | System B (series) |
| 5 | 5,000,000 | 2,000,000 |
| 10 | 6,000,000 | 2,000,000 |
| 30 | 6,000,000 | 2,000,000 |
| 60 | 4,000,000 | 2,000,000 |
| 80 | 1,000,000 | 1,000,000 |
| 100 | 800,000 | 800,000 |

It is quite evident the substitution of the macroreticular weak base anion exchange resin for the weakly basic gel resin in the mixed bed has a remarkable effect.

Examples 1 and 2 are based upon cation exchange resins regenerated completely to the hydrogen form. Under normal operating conditions, the cation exchange resin is usually regenerated to levels ranging from 25–50 percent of the total amount that can be regenerated to the hydrogen form. Example 3 describes experiments in which the cation exchange resin is regenerated to such a level.

EXAMPLE 3

The procedures of Example 2 are repeated with the exception that the cation exchange resin is regenerated to a level of 50 percent, in the hydrogen form. The following data are collected:

| Effluent bed volume | Effluent leakage (%) (500 p.p.m. NaCl influent) | |
|---|---|---|
| | System A (mixed bed) | System B (series) |
| 2 | <0.1 | 60 |
| 5 | <0.1 | 50 |
| 10 | <0.1 | 40 |
| 15 | <0.1 | 35 |
| 20 | 0.5 | 40 |
| 25 | 1.0 | 50 |
| 30 | 5.0 | 60 |

The effectiveness of the mixed bed system as compared with the two-bed system under practical conditions of regeneration and operation is readily apparent.

EXAMPLE 4

(a) A mixed bed system is prepared as taught in Example 2, except that for the strong sulfonic acid cation exchange resin there is used a macroreticular, sulfonated, cross-linked polystyrene resin, and for the weak base resin there is used a macroreticular, tertiary amine oxide, weak base resin (−25 +50 mesh) containing about 20% amine oxide functionality (kinetic half-life of less than seven minutes). The effluent water quality (using 500 p.p.m. NaCl solution as the exhaustant) at the end of ten (10) bed volumes is approximately 10 million ($10^7$) ohm-cm.

(b) A mixed bed system prepared as taught in Example 2 above, except that there is used for the weak base, cross-linked gel resin (−25 +50 mesh) prepared by condensing polyethyleneimine and ethylene dichloride (resin has an anionic exchange capacity of about 16.5 millieq./dry gm. and a kinetic half-life of less than seven minutes). The effluent water quality from this mixed bed (using again a 500 p.p.m. NaCl solution as the exhaustant) is about 3 to 4 million ohm-cm., at the end of ten to fifteen bed volumes.

If the data or results of the above examples are interpreted collectively, it becomes quite apparent that a mixed bed comprising a sulfonic acid cation exchange resin and a weak base anion exchange resin can either perform orders of magnitude better or worse than that of a two bed conventional deionization system based upon the same type of ion exchange resins. It has been found, however, that the performance depends primarily upon the nature of the weak base anion exchanger, in particular the kinetic properties, contrary to the prevailing thought that the equilibrium behavior is controlling. Further, it has been found that the kinetic properties of the weak base anion exchange resin is critical. If the rate of exchange (kinetics) of the weak base anion exchange resin is below a particular value, the performance is such that the performance of the material in the mixed bed is considerably poorer than if employed in the two bed deionization system. If the rate is above this level, the performance is improved so significantly that it exceeds that of the two-bed system. Although the importance of kinetics in ion exchange technology is well-known, the extreme sensitivity of the mixed bed system based upon a sulfonic acid cation exchange resin and a weak base anion exchange resin to the kinetics of the latter ion exchanger has never been appreciated by those involved in ion exchange technology.

The kinetic behavior of weak base anion exchange resins may be compared by measuring the half-life of the reaction between the regenerated weak base anion exchange resins and a measured quantity of standard hydrochloric acid. The kinetic half-life measurement is determined as set forth below.

Ten milliequivalents of the anion exchange resin, the kinetic half-life of which is to be determined, is contacted with 2000 ml. of 0.01 normal hydrochloric acid at room temperature (20–25° C.) and the mixture agitated. Samples of the acid are then taken periodically and analyzed for acidity until 5 milliequivalents have been consumed. The time required for this degree of acid neutralization is recorded as the kinetic half-time of time required for half of the capacity of the anion exchange resin to be neutralized.

Following this procedure, the kinetic half-life time (or half-neutralization time) of the gel, weak base, anion exchange resin used in Example 1 is determined as being about 30 minutes, and the macroreticular weak base, anion exchange resin of Example 2 has a kinetic-half time of about 3 minutes. While the above examples and determinations show that a kinetic half-time of 30 minutes is too great, the kinetic half-life reaction time need not be as little as 3 minutes; a reasonable upper limit has been determined as being about 7 minutes. Thus, the present invention requires, for its efficient operation, that the weak base anion exchange resin have a kinetic half-life reaction time (or neutralization time) of about seven (7) minutes or less. It is, therefore, evident that the kinetic half-life reaction time of the weak base anion exchange resin must be about seven minutes or less in order to function properly in a mixed bed in which the cation exchange resin component is a sulfonic acid cation exchanger.

In commercial operation, the mixed bed is operated in a column in which the solution to be treated is customarily passed in a downward direction. It must be noted, however, that there are commercial operations in which the solution is passed through the mixed bed in an upward direction. In addition, there are installations in which the resin mixture is continuously moving countercurrent to the direction of the liquid flow. The teachings of the present invention are applicable to all of these installations and operations.

After the resin mixture is exhausted, it may be separated into its component parts by passing a stream of water or other suitable liquid upwards through the mixture at a rate sufficient to carry out the less dense weak base anion exchange resin but not the denser cation exchange resin. The rate of upward flow of water best suited for the separation will depend upon the particle size of the resins, their relative density, the uniformity in the particle size, the temperature of water, and other factors. All upward flow of water through a bed of any exchange resin will cause the bed to expand and the expansion will increase as the upward flow increases until eventually it is completely carried off by the water. The upflow rate that will cause a particular ion exchange resin to be carried off by water is herein referred to as the rate for "fluidizing" the ion exchange resin. In separating the mixture of ion exchange resins herein described, a column should be used having a volume in excess of the quantity of ion exchange resin to be treated and preferably from one and one-half to two times its volume. The upward flow of water through the column will expand the bed, and by maintaining the bed in its expanded condition the difference in density between the two ion exchange resins will cause them to stratify with the lighter ones on top and the heavier ones below. In effecting a separation of the mixture of ion exchange resins herein used, the rate of upward flow of water may be gradually increased until the rate is intermediate the rate for fluidizing the weak base anion exchange resin and the rate for fluidizing the cation exchange resin; or it may be first raised to a point that will cause a predetermined expansion of the ion exchange resin bed as, for example, a 100% expansion and held at that rate to allow a partial or complete stratification of the component ion exchange resins and then raised to a rate of flow that will fluidize the weak base anion exchange resin. Both the anion and cation exchange resins, once separated in this manner, may now be regenerated simultaneously in the same unit, in accordance with known technology and as described in U.S. Pat. 2,578,937.

While the foregoing examples illustrate the invention as applied to a simple aqueous solution of common salt, it is equally applicable to other aqueous solutions of ionizable materials, such as the salts of the alkali, alkaline earth, and heavy metals with the mineral acids such as the halogen acids, sulfuric, phosphoric, and with organic acids such as formic, acetic, oxalic, succinic, malic, and citric. Other materials will occur to those skilled in the art.

Similarly, the invention is not limited to deionization of water alone but may be applied to the purification of solutions of organic materials containing polar impurities such as the removal of salts from sugar solutions in which it is particularly applicable because of the objection to acidic conditions during sugar-refining.

In general, the process is applicable with weak base anion exchange resins having a specific gravity in water below 1.15 and with cation exchange resins having a specific gravity in water above 1.2.

While the above examples show the effective use of a gel type, strong acid cation exchange resin in combination with a macroreticular, weak base anion exchange resin, the invention is applicable with both gel type resins and macroreticular, weak base anion exchange resin, the invention is applicable with both gel type resins and macroreticular resins or any combination of these resins, so long as the kinetic half-life of the weak base resin is maintained. Preferably, however, the weak base resin is a macroreticular resin. The cation exchange resins that may be used in the mixed bed include, for example, the sulfated or sulfonated phenol formaldehyde resins such as are disclosed in U.S. Pat. Nos. 2,191,853, 2,228,159, and 2,258,160; the sulfonated styrenedivinylbenzene resins described in U.S. Pat. No. 2,366,007, particularly those containing 5% or more of divinylbenzene as a crosslinker in the copolymer and the cross-linked polymers of polymerizable acids described in U.S. Pat. Nos. 2,340,110 and 2,340,111.

As noted above, the weak base resins may be either gel type or macroreticular. Chemically, the weak base anion exchange resins may be comprised of the reaction products of a primary amine or a secondary amine or mixtures of the two type of amines and an insoluble cross-linked copolymer of an aromatic monovinylhydrocarbon and an aromatic divinylhydrocarbon, whch copolymer contains haloalkyl groups of the formula —$C_nH_{2n}X$— wherein X is a chlorine or bromine atom and —$C_nH_{2n}$— is an alkylene group in which $n$ is an integer of a value from 1 to 4. Resins of this type are illustrated in U.S. Pat. 2,591,574. Other weak base resins which may also be used include, for example, the condensate resins made by condensing a material such as epichlorohydrin with a polyalkylenepolyamine, for example, as taught in U.S. Pats. 2,898,309 and 3,005,786. Still other weak base resins which may be used include the newer, weakly basic, anion exchange resins which contain tertiary amine oxide functionality, as disclosed and claimed in the U.S. patent application of Robert Walker, Ser. No. 851,456 filed Aug. 19, 1969, which is assigned to a common assignee. Other weak base resins will readily occur to those skilled in the art. These weak base resins can be used as long as they can be made up in suitable form to provide a kinetic half-life of about 7 minutes or less, as noted hereinabove. While the particle size of the resin can vary over the usually accepted commercial ranges, it is preferred that that particle size and particle size distribution be fairly narrow and uniform, and more particularly that the particle size be (with reference to U.S. Standard Size) —25 +50, i.e., minus 25 or thru 25 mesh, with the majority amount being retained on the 50 mesh screen.

What is claimed is:

1. The process of removing salts from an aqueous solution which comprises passing the solution through a bed containing a mixture of an anion exchange resin and a strong acid cation exchange resin wherein the anion exchange resin is a weakly basic anion exchange resin having a kinetic half-life reaction time of about seven (7) minutes or less.

2. Process according to claim 1 wherein the cation exchange resin contains sulfonic acid groups as its polar groups.

3. The process of removing ionizable materials from sugar solutions which comprises passing the sugar solution through a bed containing a mixture of an anion exchange resin and a strong acid cation exchange resin wherein the anion exchange resin is a weakly basic anion exchange resin having a kinetic half-life reaction time of about seven (7) minutes or less.

4. The cyclic process of deionizing a liquid which comprises passing the liquid through a mixture of a weak base anion exchange resin and a cation exchange resin, the weak base anion exchange resin having a specific gravity in water below 1.15 and a kinetic half-life reaction time of about seven (7) minutes or less, and the cation exchange resin containing sulfonic acid groups and having a specific gravity in water above 1.2 separating the liquid from the resin, passing water upwards through a column of the mixed ion exchange resins at a rate sufficient to cause a 50–100% expansion of the ion exchange resin bed and stratification of the two ion exchange resins, increasing the rate of upward flow to fluidize the anion exchanger and thereby separate it from the cation exchanger, regenerating the separated exchangers and remixing the regenerated resins.

5. The cyclic process of deionizing a liquid according to claim 4 which comprises passing the liquid through a mixture of a weak base anion exchange resin and a cation exchange resin, the weak base anion exchange resin having a specific gravity in water below 1.15 and a kinetic half-life reaction time of about seven (7) minutes or less, and the cation exchange resin containing sulfonic acid groups and having a specific gravity in water above 1.2, separating the liquid from the resin, passing water upwards through a column of the mixed resin at a rate of from about 4 to 12½ gallons per square foot of column cross section per minute to cause expansion of the resin bed and stratification of the two resins, increasing the upward flow to from 20 to 30 gals./sq. ft./min. to fluidize the anion exchange resin and separate it from the cation exchange resin, regenerating the separated resins and remixing the regenerated resins.

6. The cyclic process of deionizing a liquid according to claim 4 which comprises passing the liquid through a mixture of a weak base anion exchange resin and a cation exchange resin, the weak base anion exchange resin having a specific gravity in water below 1.15 and a kinetic half-life reaction time of about seven (7) minutes or less, and the cation exchange resin containing sulfonic acid groups and having a specific gravity in water above 1.2 separating the liquid from the resin, passing water upwards through a column of the mixed resins at an increasing rate of flow up to 20 to 30 gallons per square foot of column cross sections per minute to cause expansion of the resin bed, stratification of the two resins and finally fluidization of the anion exchange resin whereby it is separated from the cation exchange resin, regenerating the separated resins and remixing the regenerated resins.

7. The process of removing salts from an aqueous solution according to claim 1 wherein the weakly basic anion exchange resin is a macroreticular resin.

8. The process according to claim 7 wherein the weakly basic anion exchange resin is a macroreticular, tertiary amine oxide resin.

9. The process according to claim 8 wherein the resin contains at least about 20% amine oxide functionality.

10. The process according to claim 1 wherein the weakly basic anion exchange resin is a cross-linked gel resin prepared by condensing polyethyleneimine and ethylene dichloride.

References Cited
UNITED STATES PATENTS

| | | | |
|---|---|---|---|
| 2,461,505 | 2/1949 | Daniel | 210—30 X |
| 2,461,506 | 2/1949 | Daniel | 210—31 R |
| 2,578,937 | 12/1951 | Kunin | 210—30 X |
| 2,578,938 | 12/1951 | Kunin | 210—30 X |
| 2,591,574 | 4/1952 | McBurney | 260—88.1 P N |
| 2,692,244 | 10/1954 | Kunin | 210—37 X |
| 3,385,787 | 5/1968 | Crits et al. | 210—32 |
| 3,537,989 | 11/1970 | Crits | 210—32 |

SAMIH N. ZAHARNA, Primary Examiner

I. C. CINTINS, Assistant Examiner

U.S. Cl. X.R.

127—46 A, 55; 210—37